(12) United States Patent
Umminger et al.

(10) Patent No.: US 7,019,497 B2
(45) Date of Patent: *Mar. 28, 2006

(54) CIRCUITS AND METHODS FOR SYNCHRONIZING NON-CONSTANT FREQUENCY SWITCHING REGULATORS WITH A PHASE LOCKED LOOP

(75) Inventors: Christopher B. Umminger, Mountain View, CA (US); Randy G. Flatness, Los Gatos, CA (US)

(73) Assignee: Linear Technology Corporation, Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/883,892

(22) Filed: Jul. 2, 2004

(65) Prior Publication Data

US 2005/0001602 A1 Jan. 6, 2005

Related U.S. Application Data

(63) Continuation of application No. 10/197,357, filed on Jul. 15, 2002, now Pat. No. 6,774,611, which is a continuation of application No. 09/827,872, filed on Apr. 6, 2001, now Pat. No. 6,476,589.

(51) Int. Cl.
*G05F 1/10* (2006.01)
*G05F 1/656* (2006.01)
(52) U.S. Cl. .................. 323/220; 323/283; 323/220
(58) Field of Classification Search .......... 323/282, 323/223, 284, 283, 220, 224
See application file for complete search history.

(56) References Cited

U.S. PATENT DOCUMENTS

| | | | | |
|---|---|---|---|---|
| 3,458,798 A | * | 7/1969 | Howard, Jr. et al. ........ | 363/127 |
| 3,571,697 A | * | 3/1971 | Phillips ....................... | 323/222 |
| 3,579,091 A | * | 5/1971 | Clarke et al. ................ | 323/282 |
| 3,581,186 A | * | 5/1971 | Weinberger .................. | 363/127 |
| 3,582,758 A | * | 6/1971 | Gunn .......................... | 363/127 |
| 3,585,491 A | * | 6/1971 | Petersen ...................... | 323/271 |
| 3,725,766 A | * | 4/1973 | Brown ......................... | 323/220 |
| 3,733,540 A | * | 5/1973 | Hawkins ....................... | 363/89 |
| 3,772,588 A | * | 11/1973 | Kelly et al. .................. | 323/285 |
| 3,784,893 A | * | 1/1974 | Rando ........................... | 363/54 |

(Continued)

FOREIGN PATENT DOCUMENTS

EP  0090237  10/1983

(Continued)

OTHER PUBLICATIONS

Analog Devices, Inc., "High Efficiency Synchronous Step-Down Switching Regulators ADP1148, ADP1148-3.3, ADP1148-5," Datasheet, pp. 1-14, 1997**.

(Continued)

*Primary Examiner*—Bao Q. Vu
(74) *Attorney, Agent, or Firm*—Fish & Neave IP Group Ropes & Gray LLP; Mark D. Rowland; Chi-Hsin Chang

(57) ABSTRACT

Methods for synchronizing non-constant frequency switching regulators with a phase locked loop are disclosed. The methods enable non-constant frequency switching regulators to be synchronized with a phase locked loop to achieve constant frequency operation in steady state while retaining the advantages of non-frequency operation to improve transient response and operate over a wider range of duty cycles. In addition, the methods enable multiple non-constant frequency regulators to be synchronized and operated in parallel to deliver higher power levels to the output than a single switching regulator.

53 Claims, 5 Drawing Sheets

U.S. PATENT DOCUMENTS

| | | | |
|---|---|---|---|
| 3,863,128 A * | 1/1975 | Wilwerding | 315/241 P |
| 3,879,647 A * | 4/1975 | Hamilton et al. | 363/16 |
| 3,992,638 A | 11/1976 | Sauvanet | |
| 4,013,939 A | 3/1977 | Biess et al. | |
| 4,035,710 A | 7/1977 | Joyce | |
| 4,071,884 A | 1/1978 | Maigret | |
| 4,160,288 A | 7/1979 | Stuart et al. | |
| 4,309,650 A | 1/1982 | Boros et al. | |
| 4,326,245 A | 4/1982 | Saleh | |
| 4,395,675 A | 7/1983 | Toumani | |
| 4,428,015 A | 1/1984 | Nesler | |
| 4,458,199 A | 7/1984 | Evans et al. | |
| 4,462,069 A | 7/1984 | Becky | |
| 4,479,174 A | 10/1984 | Cates | |
| 4,493,017 A | 1/1985 | Kammiller et al. | |
| 4,519,024 A | 5/1985 | Federico et al. | |
| 4,541,041 A | 9/1985 | Park et al. | |
| 4,554,499 A | 11/1985 | Sherman et al. | |
| 4,578,630 A | 3/1986 | Grosch | |
| 4,610,521 A | 9/1986 | Inoue | |
| 4,634,892 A | 1/1987 | Isbell et al. | |
| 4,634,956 A | 1/1987 | Davis et al. | |
| 4,672,303 A | 6/1987 | Newton | |
| 4,672,518 A | 6/1987 | Murdock | |
| 4,674,020 A | 6/1987 | Hill | |
| 4,683,529 A | 7/1987 | Bucher, II | |
| 4,706,177 A | 11/1987 | Josephson | |
| 4,709,315 A | 11/1987 | Ramos | |
| 4,712,169 A | 12/1987 | Albach | |
| 4,716,514 A | 12/1987 | Patel | |
| 4,719,552 A | 1/1988 | Albach et al. | |
| 4,727,308 A | 2/1988 | Huljak et al. | |
| 4,754,385 A | 6/1988 | McDade et al. | |
| 4,801,859 A | 1/1989 | Dishner | |
| 4,813,066 A | 3/1989 | Holtz et al. | |
| 4,814,684 A | 3/1989 | McCurdy | |
| 4,819,122 A | 4/1989 | Gontowski, Jr. | |
| 4,823,070 A | 4/1989 | Nelson | |
| 4,837,495 A | 6/1989 | Zansky | |
| 4,843,532 A | 6/1989 | Freedman | |
| 4,866,587 A | 9/1989 | Wadlington | |
| 4,870,555 A | 9/1989 | White | |
| 4,884,183 A | 11/1989 | Sable | |
| 4,902,957 A | 2/1990 | Cassani et al. | |
| 4,922,404 A | 5/1990 | Ludwig et al. | |
| 4,928,200 A | 5/1990 | Redl et al. | |
| 4,929,882 A | 5/1990 | Szepesi | |
| 4,931,716 A | 6/1990 | Jovanovic et al. | |
| 4,996,638 A | 2/1991 | Orr | |
| 5,028,861 A | 7/1991 | Pace et al. | |
| 5,034,871 A | 7/1991 | Okamoto et al. | |
| 5,045,712 A | 9/1991 | Baggenstoss | |
| 5,066,900 A | 11/1991 | Bassett | |
| 5,068,575 A | 11/1991 | Dunsmore et al. | |
| 5,081,411 A | 1/1992 | Walker | |
| 5,097,196 A | 3/1992 | Schoneman | |
| 5,128,603 A | 7/1992 | Wölfel | |
| 5,130,561 A | 7/1992 | Elliott et al. | |
| 5,134,355 A | 7/1992 | Hastings | |
| 5,138,249 A | 8/1992 | Capel | |
| 5,144,547 A | 9/1992 | Masamoto | |
| 5,170,333 A | 12/1992 | Niwayama | |
| 5,177,676 A | 1/1993 | Inam et al. | |
| 5,179,511 A | 1/1993 | Troyk et al. | |
| 5,184,129 A | 2/1993 | Fung et al. | |
| 5,193,211 A | 3/1993 | Nobusawa | |
| 5,237,606 A | 8/1993 | Ziermann | |
| 5,309,078 A | 5/1994 | Cameron | |
| 5,315,497 A | 5/1994 | Severinsky | |
| 5,335,162 A | 8/1994 | Martin-Lopez et al. | |
| 5,396,412 A | 3/1995 | Barlage | |
| 5,408,162 A | 4/1995 | Williams | |
| 5,481,178 A | 1/1996 | Wilcox et al. | |
| 5,548,189 A | 8/1996 | Williams | |
| 5,568,044 A | 10/1996 | Bittner | |
| 5,602,465 A | 2/1997 | Clemente | |
| 5,627,460 A | 5/1997 | Bazinet et al. | |
| 5,731,694 A | 3/1998 | Wilcox et al. | |
| 5,875,104 A | 2/1999 | Prager | |
| 5,929,620 A | 7/1999 | Dobkin et al. | |
| 5,982,645 A | 11/1999 | Lowran et al. | |
| 5,994,885 A | 11/1999 | Wilcox et al. | |

FOREIGN PATENT DOCUMENTS

| | | |
|---|---|---|
| EP | 0 428 377 A2 | 5/1991 |
| JP | 60-32565 | 2/1985 |
| JP | 60-156269 | 8/1985 |
| JP | 63-307510 | 12/1988 |
| JP | 3-113986 | 11/1991 |
| JP | 4-42771 | 2/1992 |
| JP | 4-49844 | 2/1992 |
| JP | 4-101286 | 9/1992 |
| JP | 4-128086 | 11/1992 |

OTHER PUBLICATIONS

Archer, William R., "Current-Driven Synchronous Rectifier," Motorola TMOS Power FET Design Ideas, BR316, pp. 9-10, 1985.

Archer, William R., "Current Drives Synchronous Rectifier," EDN, p. 279, Nov. 28, 1985,.

Blanchard, Richard, et al., "MOSFETs Schottky Diodes Vie for Low-Voltage-Supply Designs," EDN, p. 197, Jun. 28, 1984.

Borghi et al., "Discontinuous Conduction Mode Power Switching Regulator IC," PCI Oct. 1988 Proceedings, pp. 31-41,.

Brown, Marty, "Practical Switching Power Supply Design," pp. 20-34, Academic Press, Inc., 1990.

Business Wire, "Micro Linear announces first single-chip power controller for notebook computers," Apr. 16, 1992.

Casey, L.F., "Circuit Design For 1-10 MHZ DC-DC Conversion," Massachusetts Institute of Technology ScD. Thesis, Fig. 3-15, pp. 73-80, 1989.

Cassani, John C. et al., "Sophisticated Control IC Enhances 1 MHz Current Controlled Regulator Performace," Proceedings of HFPC, May 1992, pp. 167-173.

Cherry Semiconductor, "CS-5120 Synchronous NFET Buck Controller With V2 Architecture," Datasheet, Apr. 8, 1997.

Chetty, P.R., "DC timers control dc-dc converters" Electronics, pp. 121 & 123, Nov. 13, 1975.

Chryssis, George, "High-frequency switching power supplies," pp. 144-152 and 180-181, McGraw-Hill, 1989.

Dell Computer Corporation, "Dell Computer Introduces Advanced Notebook PC," (alleged to contain UC1895, see Unitrode Advance Information Datasheet Oct. 5, 1992), Sep. 1991.

Dinsmore, D., "Dual regulator handles two input voltages," EDN, Jan. 21, 1993.

Fisher, R. A. et al., "Performance of Low Loss Synchronous Rectifiers in a Series-Parallel Resonant DC-DC Converter," Proceedings of the Fourth Annual IEEE Applied Power Electronics Conference and Exposition, pp. 240-246, Mar. 1989

Gauen, Kim, "Synchronous Rectifier Improves Step-Down Converter Efficiency," PCIM, pp. 8, 11-12 & 14-15, Apr. 1993.

Gontowski et al., "Advanced New Integrated Circuits For Current-Mode Control," Proceedings of the Power Electronics Show and Conference, pp. 341-352, Oct. 1986.

Goodenoungh, F., "Raise Switcher Efficiency Above 90%", Electronic Design, Jan. 21, 1993.

Goodenough, Frank, "Low-Voltage Analog ICs Wait in the Wings," Electronic Design, Sep. 3, 1992.

Goodenough, F., "Dozing IC Op Amps Wake Up For Input Signal," Electronic Design, Dec. 5, 1991.

Goodenough, Frank, "Sychronous Rectifier UPS PC Battery Life," Electronic Design, pp. 47-53, Apr. 16, 1992.

Gottlieb, I. M., "Practical Power-Control Techniques," Howard W. Sams & Co., pp. 116-120, 1987.

Gottlieb, I. M., Electronic Power Control, TAB Books, pp. 107-111, 1991.

Gracie, Paul D., "Intermittent Converter Saves Power," EDN, p. 151, Sep. 1, 1989.

Graf, Rudolf F., "Modern Dictionary of Electronics," 6$^{th}$ Edition, pp. 402-403, 1984.

Grant, Duncan A. et al., "Power MOSFETS, Theory and Application," pp. 239-256, Wiley-Interscience, 1989.

Harris Semiconductor, "HIP 5060 Power Control IC Single Chip Power Supply", Datasheet, Apr. 1994.

Harris Semiconductor, "HIP 5060 Power Control IC Single Chip Power Supply", Datasheet, May 1992.

Harris Semiconductor, "HIP 5060 Power Control IC Single Chip Power Supply", Preliminary Datasheet, Jan. 1992.

Harris Semiconductor, Hodgins et al., "HIP 5060 Family of Current Mode Control ICs Enhance 1 MHZ Regulator Performance," Application Note AN9212.1, pp. 11-191 to 11-197, 1992.

Hewett, S., "Improved Switched Mode Power Supply Regulation by Eliminating Turn-off Spikes," IBM Technical Disclosure Bulletin, vol. 31, No. 4, pp. 97-98, Sep. 1988.

Hnatek, Eugene R., "Design of Solid State Power Supplies," Third Edition, pp. 65-70, Van Nostrand Reinhold, 1989.

Horowitz & Hill, "The Art of Electronics," pp. 356-359, Cambridge University Press, 1989.

Huffman, B., "Efficiency and Power Characteristics of Switching Regulator Circuits," Application Note 46, Linear Technology, Nov. 1991.

Ikeda, S. et al., "Power MOSFET for Switching Regulator," International Telecommunications Energy Conference, Oct. 1982.

Impala Linear, "ILC6350 Dual Output Synchronous Step-Down DC-DC Controller," Advanced Information Preliminary Datasheet, pp. 1-6, Jan. 1997**.

Impala Linear, "ILC6311 Synchronous 3A Switching Regulator With Auto-Light Load Mode ," Preliminary Datasheet, pp. 30-38, Jan. 1997**.

Impala Linear, "ILC6310 Synchronous Step-down DC-DC Converter With Auto Light-Load Mode Select," Final Datasheet, pp. 21-38, Jun. 1996**.

Impala Linear, "ILC6330 13A Adjustable Sychronous DC-DC Controller," Preliminary Datasheet, pp. 39-41, Jun. 1996**.

International Rectifier, "IR Application Note AN-978, HV Floating MOS Gate Driver ICs, Full Bridge With Current Mode Control," Application Note from web page, Date Unknown.

International Rectifier, "IR Application Note AN-978, HV Floating MOS-Gate Driver ICs, A Typical Block Diagram," Application Note from web page, Date Unknown.

International Rectifier, Clemente et al., "HV Floating MOS-Gate Driver IC," Application Note AN-978A, 1990.

Intersil, "ISL6223 Mobile Microprocessor CORE Voltage Regulator Multi-Phase Buck PWM Controller," Datasheet, Mar. 1991**.

Kassakian, J. et al., "Principles of Power Electronics," pp. 103-165, Addison-Wesley Publishing Company, 1991.

Kerridge, Brian, "Battery power breeds efficient regulators," EDN, pp. 103-108, Mar. 18, 1993.

Lee, Y.S. and Cheng, Y. C., "A 580 kHz switching regulator using on-off control," Journal of the Institution of Electronic and Radio Engineers, vol. 57, No. 5, pp. 221-226, Sep. 1987

Lee, et al., "Design of Switching Regulator with Combined FM and On-Off Control," IEEE Transactions on Aerospace and Electronic Systems, vol. AES-22, No. 6, pp. 725-731, Nov. 1986.

Linear Technology, "LT1074 Switching Regulator," Preliminary Datasheet, Jun. 1989.

Linear Technology, "LT1072 1.25A High Efficiency Switching Regulator," Datasheet, 1990.

Linear Technology, "New Device Cameos," *Linear Technology Magazine*, 10:18-19 1992.

Linear Technology, Wilcox, M., "LT1158 Half Bridge N-Channel Power MOSFET Driver," Datasheet, 1992.

Linear Technology, Williams, J., Application Note 29, "Some Thoughts on DC-DC Converters," 1990 Linear Applications Handbook, pp. AN29-1 to AN29-44, Oct. 1988.

Linear Technology, "LT1524/LT3524 Regulating Pulse Width Modulator," 1990.

Linear Technology, "LT1432 5V High Efficiency Step-Down Switching Regulator Controller," *1992 Linear Datasheet Supplement*, pp. 4-145 to 4-171.

Linear Technology, "LT1170/LT1171/LT1172 100kHz 5A, 2.5A, 1.25A High Efficiency Switching Regulators," Data Sheet, 1991.

Linear Technology, "LT1271/LT1269 4A High Efficiency Switching Regulators," Data Sheet, 1992.

Linear Technology, Pietkiewicz et al., "DC-DC Converters for Portable Computers," Design Note 52, 1991.

Linear Technology, Nelson, C., App. Note 19, "LT-1070 Design Manual ," Jun. 1986.

Linear Technology, "LTC1873 Dual 550 kHz Synchronous 2-Phase Switching Regulator Controller With 5-Bit VID," Datasheet, 1999**.

Linear Technology, "LTC1878 High Efficiency Monolithic Synchronous Step-Down Regulator," Initial Release, Final Electrical Specifications, May 2000**.

Linear Technology, "LTC1702 Dual 550 kHz Synchronous 2-Phase Switching Regulator Controller," Datasheet, 1999**.

Linear Technology, "LTC3711 5-Bit Adjustable, Wide Operating Range, $^{NO\ R}$Sense™ Step-Down Controller," Initial Release Datasheet, Jan. 2001.

Linear Technology, "LTC3714 Intel Compatible, Wide Operating Range, Step-Down Controller with Internal Op Amp," Initial Release Datasheet, Apr. 2001.

Linear Technology, Williams, J., App. Note 25, "Switching Regulators for Poets," Sep. 1987.

Linear Technology, "LT1846/1847, LT3846/3847 Current Mode PWM Controller," Datasheet, 1990.

Linear Technology, "LTC1703 Dual 550 kHz Synchronous 2-Phase Switching Regulator Controller with 5-Bit VID," Datasheet, 1999**.

Linear Technology, "LTC1735 High Efficiency Synchronous Step-Down Switching Regulator," Datasheet, 1998**.

Linear Technology, "LTC1736 5-Bit Adjustable High Efficiency Synchronous Step-Down Switching Regulator," Datasheet, 1999**.
Linear Technology, "LTC1775 High Power $^{NO\ R}$Sense™ Current Mode Synchronous Step-Down Switching Regulator," Datasheet, 1999**.
Linear Technology, Williams, J., Application Note 35, "Step Down Switching Regulators," 1990 Linear Applications Handbook, pp. AN35-1 to AN35-32, Aug. 1989.
Linear Technology, "LTC1436A/LTC1436A-PLL/LTC1437A High Efficiency Low Noise Synchronous Step-Down Switching Regulators," Datasheet, 1996**.
Linear Technology, "LTC1438/LTC1439 Dual High Efficiency, Low Noise, Synchronous Step-Down Switching Regulators," Datasheet, 1997**.
Linear Technology, "LT1307/LT1307B Cell Micropower 600 kHz PWM DC/DC Converters," Datasheet, 1995.
Linear Technology, "LTC1148/LTC1148-3.3/LTC1148-5 High Efficiency Synchronous Step-Down Switching Regulators," Preliminary Datasheet, Nov. 1992.
Linear Technology, "LTC1148 /LTC1148-3.3/LTC1148-5 High-Efficiency Synchronous Step-Down Switching Regulators," Datasheet, 1993.
Linear Technology, "LTC1625 $^{NO\ R}$Sense™ Current Mode Synchronous Step-Down Switching Regulator," Datasheet, 1998.
Linear Technology, Nelson., C., "The LT1432:5 Volt Regulator Achieves 90% Efficiency," *Linear Technology Magazine*, vol. 2, No. 1, pp. 18-19, Feb. 1992.
Linear Technology, Pietkiewicz, S., "A Low Voltage, Micro-Power 1 Amp Switching Regulator," presented at the International Solid State Circuits Conference, 1990.
Linear Technology, LT1073 Micropower DC-DC Converter Adjustable and Fixed 5V, 12V, Datasheet, 1991.
Linear Technology, "LT1074/LT1076 Step-Down Switching Regulator," Datasheet, 1994.
Linear Technology, "LT1500/LT1501 Adaptive-Frequency Current Mode Switching Regulators," Datasheet, 1996.
Linear Technology, "LTC1538-AUX/LTC1539 Dual High Efficiency, Low Noise, Synchronous, Step-Down Switching Regulators," Datasheet, 1996**.
Linear Technology, "LTC1142/LTC1142L/LTC1142HV Dual High Efficiency Synchronous Step-Down Switching Regulators," Datasheet, 1995**.
Linear Technology, "LTC1149/LTC1149-3.3/LTC1149-5 High Efficiency Synchronous Step-Down Switching Regulators," Datasheet, 1993**.
Linear Technology, "LTC1627 Monolithic Synchronous Step-Down Switching Regulator," Datasheet, 1998**.
Linear Technology, "LTC1628/LTC1628-PG High Efficiency, 2-Phase Synchronous Step-Down Switching Regulators," Datasheet, 1998.
Linear Technology, "LTC1159/LTC1159-3.3/LTC1159-5 High Efficiency Synchronous Step-Down Switching Regulators," Datasheet, 1994**.
Linear Technology, "LTC1778 Wide Operating Range, $^{NO}$ RSense™ Step-Down Controller," Datasheet, Jan. 2001.
Linear Technology, "LTC1435 High Efficiency Low Noise Synchronous Step-Down Switching Regulator,"0 Datasheet, 1996**.
Linear Technology, "LTC1267/LTC1267-ADJ/LTC1267-ADJ5 Dual High Efficiency Synchronous Step-Down Switching Regulators," Datasheet, 1995**.
Linear Technology, "LTC1266/LTC1266-3.3/LTC1266-5 Synchronous Regulator Controller for NB or P-Channel MOSFETs," Datasheet, 1995**.
Linear Technology, "LTC1877 High Efficiency Monolithic Synchronous Step-Down Regulator," Initial Release Datasheet, May 2000.
Markus, John, "Guidebook of Electronic Circuits," pp. 647 & 649, 1971.
Maxim Integrated Products, Inc., "MAX638 Fixed +5V CMOS Step-Down Switching Regulator," Maxim 1989 Integrated Circuits Data Book, pp. 6-57 to 6-64, 1989.
Maxim Integrated Products, Inc., "MAX782/MAX786 Notebook Computer Power Supplies," Advance Information Data Sheet, Feb. 1993, pp. 1-8.
Maxim Integrated Products, "MAX1630-MAX1635 Multi-Output, Low-Noise Power Supply Controllers for Notebook Computers," Datasheet Rev. 3; Apr. 1997**.
Maxim Integrated Products, Inc., "MAX798 High-Accuracy Step-Down Controller With Synchronous Rectifier for CPU Power," Datasheet, Dec. 1996**.
Maxim Integrated Products, "MAX796/MAX797/MAX799 Step-Down Controllers With Synchronous Rectifier for CPU Power," Datasheet Rev. 3a; Nov. 1997**.
Maxim Integrated Products, Inc., MAX782, Addendum to Advance Information Sheet and EV Kit Document, bearing Bates No. L07760 -007785, contains dates in Feb. 1993 and Mar. 1993 (MAX782 Advance Information Data Sheet cited above).
Maxim Integrated Products, "MAX1710/MAX1711/MAX1712 High-Speed, Digitally Adjusted Step-Down Controllers for Notebook CPUs," Datasheet, 2000.
Maxim Integrated Products, Inc., "MAX635/636/637 Fixed Output CMOS Inverting Switching Regulators," Maxim 1989 Integrated Circuits Data Book, pp. 6-49 to 6-46, 1989.
Maxim Integrated Products, Inc., "MAX639 High-Efficiency, +5V Adjustable Step-Down Switching Regulator," Datasheet, Dec. 1991.
Maxim Integrated Products, Inc., "MAX635/636/637 Preset/Adjustable Output CMOS Inverting Switching Regulators," Datasheet, Date Unknown.
Maxim Integrated Products, Inc., "MAX782 Triple-Output Power-Supply Controller for Notebook Computers," Datasheet Rev. 2; May 1994**.
Maxim Integrated Products, Inc., "MAX783 Triple-Output Power-Supply Controller for Notebook Computers," Datasheet, May 1994.
Maxim Integrated Products, "MAX887 100% Duty Cycle, Low-Noise, Step-Down PWM DC-DC Converter," Datasheet, Sep. 1996.
Maxim Integrated Products, Inc., "MAX746 High-Efficiency, PWM, Step-Down, N-Channel DC-DC Controller, " Datasheet, Nov. 1993.
Maxim Integrated Products, Inc., "MAX747 High-Efficiency PWM, Step-Down P-Channel DC-DC Controller," Datasheet, Sep. 1993.
Maxim Integrated Products, Inc., "MAX777L/MAX778L/MAX779L Low-Voltage Input, 3V/3.3V/5V/ Adjustable Output, Step-Up DC-DC Converters," Datasheet, Jul. 1996.
Maxim Integrated Products, "MAX767 5V-to-3.3V, Synchronous, Step-Down Power-Supply Controller," Datasheet Rev. 2; Aug. 1994**.
Meakin, Mike, "The LM3578 Switching Power Regulator," Electronic Engineering, pp. 47-52, Jul. 1986.
Micro Linear Corporation, "ML4861 Low Voltage Boost Regulator," Preliminary Datasheet, Jul. 1992.

Micro Linear Corporation, "ML 4822 DC/DC Converter Controller for Portable Computers," Datasheet, Aug. 1991.
Micro Linear Corporation, "ML4862 EVAL User's Guide," Jun. 1992.
Micro Linear Corporation, "ML4873 Battery Power Control IC," Datasheet, Jan. 1997 (preliminary version Mar. 1993—cited below).
Micro Linear Corporation, "ML4862 Battery Power Control IC," Datasheet, Mar. 1997.
Micro Linear Corporation, "ML4862 Battery Power Control IC," Advance Information Datasheet, Jul. 1992.
Micro Linear Corporation, "ML4860 Battery to DC Power Control IC for Portable Systems," Advanced Information, Feb. 1992.
Micro Linear Corporation, "ML4873 Battery Power Control IC," Advance Information Data Sheet, Mar. 15, 1993, pp. 1-8.
Myers, R. and Peck, R., "200-kHz Power FET Technology in New Modular Power Supplies," Hewlett-Packard Journal, Aug. 1981.
NASA Jet Propulsion Laboratory, "Synchronous Half-Wave Rectifier," Jul. 1989.
National Semiconductor Corporation, "LM1578/LM2578/LM3578 Switching Regualtor," Preliminary Datasheet, 1987.
Patel, Raoji, "Using Bipolar Synchronous Rectifiers Improves Power Supply Efficiency," Proceedings of the Power Sources Conference, Nov. 1984.
Patel, R., "Bipolar synchronous rectifiers cut supply losses," EDN, Apr. 4, 1985.
Quinnell, Richard A., "Analog IC Combines Five Functions for Battery Power Management," EDN, Apr. 23, 1992.
Redl et al., "Frequency Stabilization and Synchronization of Free-Running Current-Mode Controlled Converters," PESC '86 Record, pp. 519-530, 1986.
Redl, et al., "Overload-Protection Methods For Switching-Mode DC/DC Converters: Classification, Analysis, and Improvements," PESC '87 Record, pp. 107-118, 1987.
Rippel, W.E., "Synchronous Half-Wave Rectifier," NASA Jet Propulsion Laboratory Technical Support Package vol. 13, No. 7, Item #15, Jul. 1989.
Sakai, E. and Harada, K., "A New Synchronous Rectifier Using Bipolar Transistor Driven by Current Transformer," Fourteenth International Telecommunications Energy Conference, pp. 424-429, Oct. 1992.
Sakai, E. and Harada, K., "Synchronous Rectifier Using a Bipolar Transistor Driven by Current Transformer," Journal of the Society of Electronic Data Communication, vol. J-74-B-I, No. 8, pp. 639-646, Aug. 1991 (in Japanese, with translation).
Savant, C.J., Jr., et al., "Electronic Design: Circuits and Systems," pp. 612-613, The Benjamin/Cummings Publishing Co., 1991.
Shepard, J., "Powering portable systems," EDN, Nov. 5, 1992.
Siliconix, "Si91XX Synchronous Buck Controller," Objective Specification, Dec. 20, 1990.
Siliconix, "Siliconix Si9110/Si9111," Datasheet, Oct. 1987.
Siliconix, "Synchronous Rectification," Design Ideas, Oct. 1980.
Siliconix, "Si9150 Synchronous Buck Regulator Controller, S-42677, Rev. D," Datasheet, Feb. 14, 1995.
Siliconix, "High-Efficiency Buck Converter for Notebook Computers," Application Note AN92-4, Date Unknown.
Siliconix, "Designing DC/DC Converters with the Si9110 Switchmode Controller," Siliconix Power Products Data Book, 1991.
Siliconix, "Si9150CY/BCY Synchronous Buck Converter Controller," Preliminary Data Sheet, Oct. 8, 1992.
Siliconix, "Si9150 Synchronous Buck Converter Controller," Objective Specification, handwritten pp. 7-17, Sep. 10, 1991.
Siliconix, Si9150 documents bearing Bates No. U040269-71, 9104.
Soclof, Sidney, "Applications of Analog Integrated Circuits," Figure 2.25, pp. 74-75, Prentice-Hall, Inc. 1985.
Sokal et al., "Control Algorithms and Circuit Designs For Optimally Flyback-Charging an Energy-Storage Capacitor," IEEE Fifth Applied Power Electronics Conference, pp. 295-301, 1990.
Steigerwald, R., "High-Frequency Resonant Transistor DC-DC Converters," IEEE Transactions on Industrial Electronics, vol. IE-31, No. 2, pp. 181-191, May 1984.
Taylor, "Flyback Converter," Electronic Engineering, p. 23, Jul. 1976.
Texas Instruments, "TPS5120 Dual Output, Two-Phase Synchronous Buck DC/DC Controller," Datasheet, Feb. 2001.
Toyoda, "SB3012P Step Down DC-DC Converter Controller," Datasheet, Mar. 1997**.
Toyoda, "SB3030P Step Down DC-DC Converter Controller," Datasheet, Dec. 1996**.
Toyoda, "SB3011P Step Down DC-DC Converter Controller," Datasheet, Mar. 1997**.
Toyoda, "SB3052P Dual Channel Step Down DC-DC Converter Controller," Datasheet, Feb. 1998**.
Toyoda, "SB3020P Dual Channel Step Down DC-DC Converter Controller," Datasheet, Mar. 1997**.
Toyoda, "SB3010P Synchronous Stepdown DC-DC Converter Controller," Datasheet, Aug. 10, 1995**.
Toyoda, "SB3013P Step Down DC-DC Converter Controller," Datasheet, Mar. 1997**.
Toyoda, "SB3050P Dual Channel Step Down DC-DC Converter Controller," Datasheet, Mar. 1997**.
Toyoda, "SB3031P Step Down DC-DC Converter Controller," Datasheet, Dec. 1996**.
Uchida, Takahito, "Switching Regulator Controller," Japanese Inventor Associated Disclosed Technology Publication No. 92-2362, published Feb. 15, 1992 (in Japanese, with translation).
Umminger, Christopher, B., "New No $^R$SENSE™ Controllers Deliver Very Low Output Voltages," Linear Technology Magazine, pp. 16-20, Feb. 2001.
Unitrode, "Using Bipolar Synchronous Rectifiers Improves Power Supply Efficiency," Application Note U-103, 1989-1990 Unitrode Semiconductor Databook and Application Notes, pp. 12-88 to 12-94, Jun. 1985.
Unitrode, "UC1846/7, UC2846/7, UC3546/7 Current Mode PWM Controller," Datasheet, dated Jan. 1997 (date of first publication unknown).
Unitrode, "UCC29421/2, UCC39421/2 Multimode High Frequency PWM Controller," Preliminary Datasheet, Oct. 1997**.
Unitrode, "UC1874-1,-2, UC2874-1,-2, UC3874-1,-2 High Efficiency, Synchronous Step-Down (Buck) Controllers," Datasheet, Feb. 1998**.
Unitrode, "UC1895, UC2895, UC3895 Synchronous Rectifier Buck PWM Controller," Advance Information Datasheet, Oct. 6, 1992.

Unitrode, "UC1870-1/-2, UC2870-1/-2, UC3870-1/-2 High Efficiency, Synchronous, Step-Down (Buck) Controllers," Datasheet, Aug. 1998**.

Unitrode, "UC3941-3/-5/-ADJ 1V Synchronous Boost Converter," Preliminary Datasheet, Mar. 1997**.

Unitrode, "UCC19411/2/3, UCC29411/2/3, UCC39411/2/3 Low Power Synchronous Boost Converter," Preliminary Datasheet, Apr. 1998**.

Unitrode, "UCC1582, UCC2582, UCC3582 High Efficiency Synchronous, Step Down Controller," Preliminary Datasheet, Jan. 1997**.

Wilcox, M., "The LT1158: Low Voltage, N-Channel Bridge Design Made Easy," *Linear Technology Magazine*, vol. 2, No. 1, Feb. 1992.

Williams, J. and Huffman, B., "Proper instrumentation eases low-power dc/dc converter design," EDN, Oct. 27, 1988.

Williams, J., "Basic Principles and Ingenious Circuits Yield Stout Switchers," EDN, Jan. 18, 1990.

Williams, J., "Signal conditioning circuits use μpower design techniques," EDN, Aug. 20, 1987.

Williams, J., "Employ pulse-width modulators in a wide range of controllers," EDN, Sep. 2, 1981.

Williams, J., "Switching regulator takes on more power," Electronic Product Design, Jan. 1986.

Williams, J., "Design dc-dc converters to catch noise at the source," Electronic Design, Oct. 15, 1981.

Williams, J., "Conversion techniques adapt voltages to your needs," EDN, Nov. 10, 1982.

Williams, J., "Special circuit-design techniques enhance regulator performance," EDN, Sep. 1, 1983.

Williams, J., "Use low-power design methods to condition battery outputs," EDN, Oct. 18, 1984.

Williams, J., "Chopper amplifier improves operation of diverse circuits," EDN, Mar. 7, 1985.

Williams, J., "Refine V/F-converter operation with novel design techniques," EDN, May 30, 1985.

Williams, J. and Huffman, B., "Design dc/dc converters for power conservation and efficiency," EDN, Nov. 10, 1988.

Williams, J. and Waller, B., "Performance-Enhancement Techniques for Three-Terminal Regulators," New Electronics, Oct. 4, 1983.

Williams, J. and Huffman, B., "Switched-capacitor networks simplify dc/dc-converter designs," EDN, Nov. 24, 1988.

Williams, J., "Regulator IC speeds design of switching power supplies," EDN, Nov. 12, 1987.

Williams, J., "Micropower circuits assist low-current signal conditioning," EDN, Aug. 6, 1987.

Williams, J. and Huffman, B., "Precise converter designs enhance system performance," EDN, Oct. 13, 1988.

Williams, J. and Dendinger, S., "Simplify feedback controllers with a 2-quadrant PWM IC," EDN, May 26, 1983.

Williams, J., "Bridge forms synchronous rectifier," EDN, Date Unknown.

Williams, J., "Designing supplies for powering LCD backlighting," EDN, Oct. 29, 1992.

Williams, J., "1.5 to 5V converter supplies 200mA," EDN, Oct. 15, 1992.

Williams, J., "Design linear circuits the serve digital system needs," EDN, Apr. 27, 1989.

Williams, J., "Clever techniques improve thermocouple measurements," EDN, May 26, 1988.

Williams, J., "Design techniques extend V/F-converter performance," EDN, May 16, 1985.

Williams, J., "Design linear circuits for 5V operation," EDN, May 2, 1985.

Williams, J., "Considerations for Five Volt Linear Circuits," Professional Program Session Record 20, Circuits for Analog Signal Processing and Data Conversion is Single +5V Supply Systems, Wescon/85, Nov. 1985.

Williams, J., "Analog circuits operate from a 1.5V cell," EDN, Sep. 19, 1985.

Williams, J., "Astute designs improve efficiencies of linear regulators," EDN, Aug. 17, 1989.

Williams, J., "Galvanically isolated switching supplies provide high power," EDN, Nov. 26, 1987.

Williams, J., "Correcting power-supply problems," EDN, Oct. 10, 1991.

Unitrode's First Amended Answer to Amended Complaint for Patent Infringement.

Linear Technology Corporation's Reply and Counterclaims to Unitrode's First Amended Answer to LTC's Amended Complaint.

Order dated Sep. 21, 2001, Linear Technology Corporation v. Impala Linear Corporation, No. C-98-1727 VRW (N.D. Cal.).

Claim Construction Order dated Jun. 9, 1999, Linear Technology Corporation v. Impala Linear Corporation, No. C 98-1727 EMS (N.D. Cal.).

Preliminary Opinion from the Opposition Division dated Jul. 16, 2002, Application No. 94 104 509.8.

Written Interlocutory Decision from the Opposition Division dated Dec. 23, 2002, Application No. 94 104 509.8.

*Linear Technology Corp.* v. *Impala Linear Corp.*, 379 F.3d 1311 (Fed. Cir. 2004). Issued Aug. 24, 2004.

Communication from EPO dated Feb. 22, 2005 for European Patent Application No. 02 007 264.1—1242.

Reply to Communication from EPO dated Feb. 22, 2005 for European Patent Application No. 02 007 264.1—1242. Reply is dated Sep. 5, 2005.

* cited by examiner

CIRCUITS AND METHODS FOR SYNCHRONIZING NON-CONSTANT FREQUENCY SWITCHING REGULATORS WITH A PHASE LOCKED LOOP

FIELD OF THE INVENTION

This invention relates generally to switching voltage regulators. More specifically, the present invention provides circuits and methods for synchronizing non-constant frequency switching regulators with a phase locked loop.

BACKGROUND OF THE INVENTION

Voltage regulators are an essential component of most electronic devices which operate at a specified DC voltage. Typically, the electronic devices are powered with a source voltage that is fluctuating (i.e., provided by a power supply connected into a wall socket) or at an inappropriate amplitude (i.e., provided by a battery). The purpose of a voltage regulator is to convert the source voltage into the operating DC voltage of the electronic devices.

One type of a commonly used voltage regulator is a switching voltage regulator. Switching voltage regulators employ one or more switching elements and an inductor, transformer, or a capacitor as an energy storage element between the source and the load. The switching elements may be, for example, power metal-oxide semiconductor field-effect transistor (MOSFET) switches. The switching regulator regulates the voltage across the load by varying the ON-OFF times of the switching elements so that power is transmitted through the switching elements and into the energy storage element in the form of discrete current pulses. The current pulses may be generated by one-shot timers or other circuitry. The energy storage element then converts these current pulses into a steady load current so that the load voltage is regulated.

Switching regulators include control circuitry to control the ON-OFF times of the switching elements. The percentage of time that a switching element is ON is referred to as its duty cycle. The duty cycle can be varied in three ways by: (1) fixing the frequency of the pulses and varying the ON or OFF time of each pulse; (2) fixing the ON or OFF time of each pulse and varying the frequency of the pulses; or (3) varying both the ON and OFF times of each pulse and varying the frequency of the pulses (e.g., hysteretic mode control). Examples of prior art constant frequency switching regulators include the LT1307, LTC1625, and LT1074, developed by Linear Technology Corporation, of Milpitas, Calif. Examples of prior art non-constant frequency switching regulators include the MAX1710 (constant on-time), developed by Maxim Integrated Products, Inc., of Sunnyvale, Calif., the CS5120 (constant off-time), developed by ON Semiconductor, of Phoenix, Ariz., and the LT1500, LTC1148, and LTC1778 of Linear Technology Corporation.

Constant frequency switching regulators are in general preferred to non-constant frequency switching regulators, since the frequency can be selected to avoid noise-sensitive regions. For example, when using switching regulators in communications equipment such as wireless devices, it is desirable to keep the switching frequency away from the communication frequencies of the communications equipment. Constant frequency operation also enables multiple power converters to be synchronized when it becomes necessary to deliver higher power levels to the output.

However, constant frequency switching regulators are in general more complex to design, have a slower transient response, and cannot operate over as wide a range of duty cycles as non-constant frequency switching regulators. Switching regulators must be able to operate efficiently at low duty cycles and over a wide range of input and output voltages to provide the voltages required by modern electronic devices, which may be very low compared to the source voltages. With today's microprocessors requiring faster transient response and lower operating voltages than previous generations, every effort must be made to improve the transient response and increase the duty cycle range of switching regulators, while meeting cost goals.

At present, there are no switching regulators that simultaneously provide the advantages of both constant frequency and non-constant frequency operation. While constant frequency regulators suffer in the transient response and the range of operating duty cycles as compared to non-constant frequency regulators, non-constant frequency regulators may not be able to avoid the sensitive frequencies of the electronic devices and deliver high power levels to the output.

Current non-constant frequency regulators such as the MAX1710 and the LTC1778 are able to achieve approximately constant frequency operation through the use of a flexible one shot timer to control the ON-time of one of the switching elements. The one shot timer allows the switching regulators to operate at very low duty cycles and convert high input voltages to low output voltages. However, the switching frequency can still vary significantly due to second order effects in the switching regulator.

In view of the foregoing, it would be desirable to provide circuits and methods for achieving constant frequency operation with non-constant frequency switching voltage regulators.

It further would be desirable to provide circuits and methods for adjusting the switching frequency of a non-constant frequency switching regulator through the $I_{ON}$ and $V_{ON}$ inputs of a one shot timer used to control the duty cycle of the switching regulator.

It also would be desirable to provide circuits and methods for synchronizing multiple switching regulators to deliver higher power levels to the output.

SUMMARY OF THE INVENTION

In view of the foregoing, it is an object of the present invention to provide circuits and methods for achieving constant frequency operation with non-constant frequency switching voltage regulators.

It is a further object of the present invention to provide circuits and methods for adjusting the switching frequency of a non-constant frequency switching regulator through the $I_{ON}$ and $V_{ON}$ inputs of a one shot timer used to control the duty cycle of the switching regulator.

It also is an object of the present invention to provide circuits and methods for synchronizing multiple switching regulators to deliver higher power levels to the output.

These and other objects of the present invention are accomplished by providing circuits and methods for synchronizing non-constant frequency switching regulators. In a preferred embodiment, non-constant frequency switching regulators are synchronized with a phase locked loop. The phase locked loop controls the duty cycle of the switching transistors in the switching regulator by adjusting the $I_{ON}$ and $V_{ON}$ inputs of the one-shot timer used in the switching regulator. The circuits and methods of the present invention are applicable to both synchronous and non-synchronous switching regulators employing current-mode control, voltage-mode control, or a hybrid of current-mode and voltage-mode control. In addition, the circuits and methods of the present invention may be used to synchronize a variety of switching regulators, such as boost (step-up), buck (step-down), or buck-boost switching regulators, with constant on-time, constant off-time, or hysteretic mode control.

Advantageously, the present invention enables a non-constant frequency switching regulator to be synchronized with a phase locked loop to achieve constant frequency operation in steady state while having a wider duty cycle range and faster transient response than a constant frequency switching regulator.

In addition, the present invention enables multiple regulators to be synchronized and operated in parallel to deliver higher power levels to the output.

BRIEF DESCRIPTION OF THE DRAWINGS

The foregoing and other objects of the present invention will be apparent upon consideration of the following detailed description, taken in conjunction with the accompanying drawings, in which like reference characters refer to like parts throughout, and in which.

DETAILED DESCRIPTION OF THE INVENTION

The present invention provides methods for synchronizing non-constant frequency switching regulators with a phase locked loop. To provide background for the present invention, the operation of an illustrative and previously known non-constant frequency synchronous switching regulator is described. Then, the methods for synchronizing such previously known regulators with a phase locked loop are disclosed.

Figure 1:
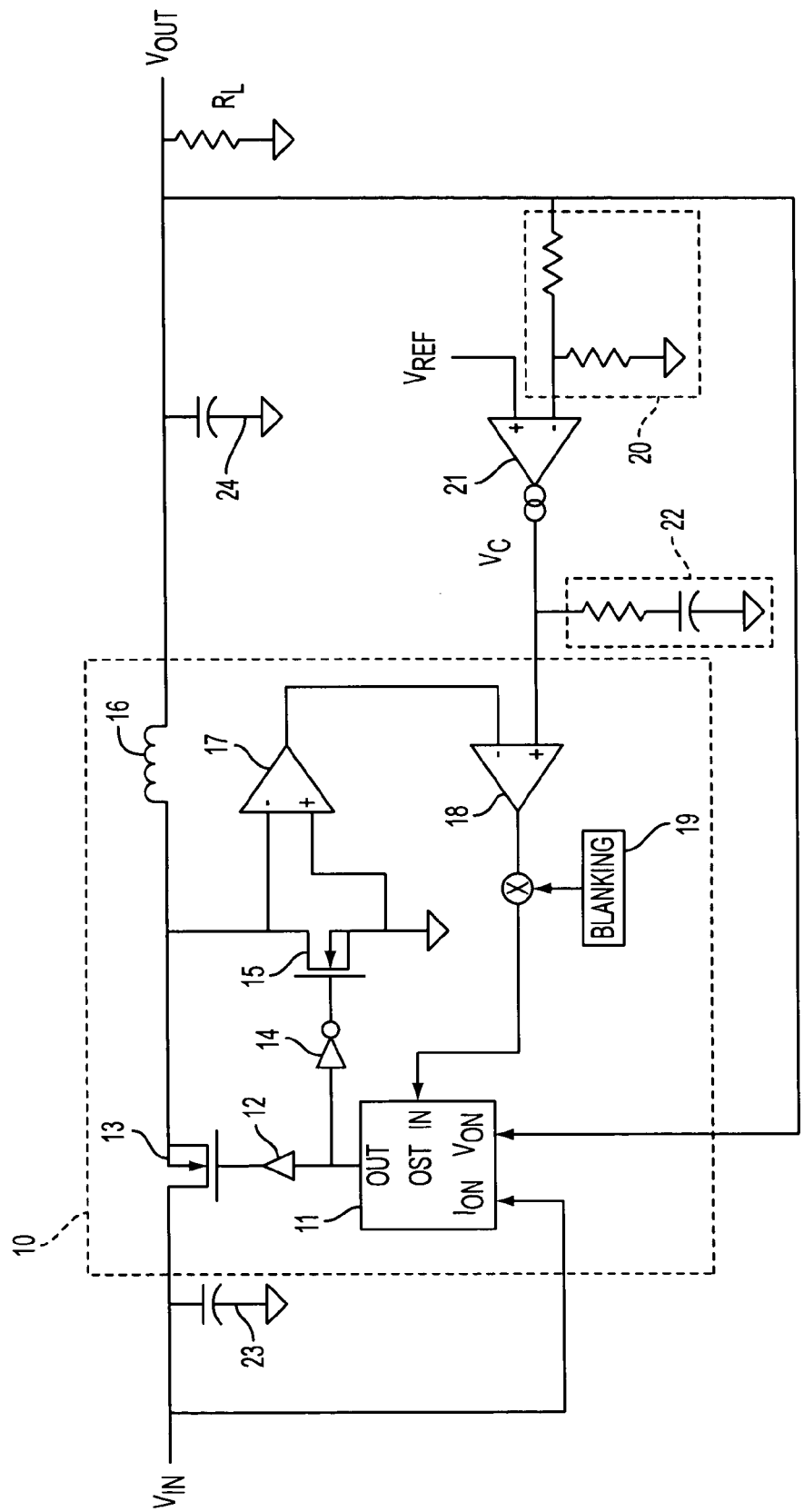
FIG. 1 is a schematic diagram of an illustrative prior art step-down, non-constant frequency synchronous switching voltage regulator using current-mode control.

Referring to FIG. 1, a schematic diagram of an illustrative prior art step-down, non-constant frequency synchronous switching voltage regulator using current-mode control is described. Switching regulator 10 typically is used for DC-to-DC conversion of an unregulated supply voltage $V_{IN}$, such as a battery, to a regulated output voltage $V_{OUT}$ for driving a load $R_L$. Although $R_L$ is simply shown as a resistor, it may be, for example, a portable communication device or a computer. Examples of step-down, non-constant frequency synchronous switching regulators using a one shot timer to control the duty cycle of the switching transistors include the LTC1778, the LTC3711, and the LTC3714, sold by Linear Technology Corporation, of Milpitas, Calif., and the MAX1710, sold by Maxim Integrated Products, Inc., of Sunnyvale, Calif. The LTC1778, the LTC3711, and the LTC3714 use current-mode control, whereas the MAX1710 uses a hybrid of current-mode and voltage-mode control.

Switching regulator 10 operates as follows: at the beginning of a cycle, one shot timer 11 generates a pulse that causes driver 12 to turn ON main switching transistor 13 and driver 14 to turn OFF synchronous switching transistor 15. This results in a voltage of approximately $V_{IN}-V_{OUT}$ across inductor 16, causing the current in this inductor to increase. When the one shot timer pulse ends, the output of one shot timer 11 goes low, causing driver 12 to turn OFF main switching transistor 13 and driver 14 to turn ON synchronous switching transistor 15. As a result, a voltage of $-V_{OUT}$ is applied across inductor 16, causing the current in this inductor to decrease.

While the inductor current flows through synchronous switch 15, it creates a voltage equal to the product of the inductor current and the ON-resistance of switch 15. This voltage is sensed by current amplifier 17 and applied to current comparator 18. When the sense voltage drops below the control voltage $V_C$, the output of current comparator 18 goes high and initiates another pulse from one shot timer 11, thereby repeating the cycle. During the time that synchronous switch 15 is off, blanking circuitry 19 disables the output of current comparator 18. The frequency at which one shot timer 11 operates is referred to as the switching frequency. Inductor 16 and capacitor 24 form a low-pass filter to remove undesirable harmonics of the switching frequency from output voltage $V_{OUT}$.

The control voltage $V_C$ determines the inductor current through the current-mode loop comprising current sense amplifier 17, current comparator 18, one shot timer 11, and drivers 12 and 14 with switches 13 and 15. The control voltage is determined by the voltage error loop comprised of resistor divider 20, error amplifier 21, compensation components 22, and current comparator 18. In this type of current-mode regulation, the control voltage $V_C$ corresponds to the inductor current valley. If $V_{OUT}$ decreases, the resulting voltage drop at the input of error amplifier 21 causes an increase in the control voltage $V_C$ that appears across compensation components 22. This results in an increase in the average inductor current, causing $V_{OUT}$ to increase until the negative input to error amplifier 21 matches the reference. Conversely, if $V_{OUT}$ increases, the control voltage $V_C$ is temporarily reduced, decreasing $V_{OUT}$ until the negative input to error amplifier 21 again matches the reference. In this way, the control voltage $V_C$ is continuously adjusted such that the output voltage is maintained constant.

The use of one shot timer 11 allows switching regulator 10 to turn on main switch 13 for a very small amount of time. Small and constant switch on-times allow switching regulator 10 to operate at very low duty cycles and convert high input voltages to low output voltages. However, a constant on-time requires that the off-time vary with changes in the input and output voltages as well as with load current. Therefore, the switching frequency will also vary.

To minimize this variation, one shot timer 11 accepts $V_{IN}$ and $V_{OUT}$ as inputs to generate an on-time pulse that is proportional to $V_{OUT}$ and inversely proportional to $V_{IN}$. This maintains the switching frequency substantially constant because the on-time changes appropriately as $V_{IN}$ and $V_{OUT}$ vary. However, a variety of second order effects such as parasitic resistances and switching losses can cause the required on-time at a particular frequency to deviate from that given by one shot timer 11. The result is that the switching frequency can still vary significantly.

Figure 2:
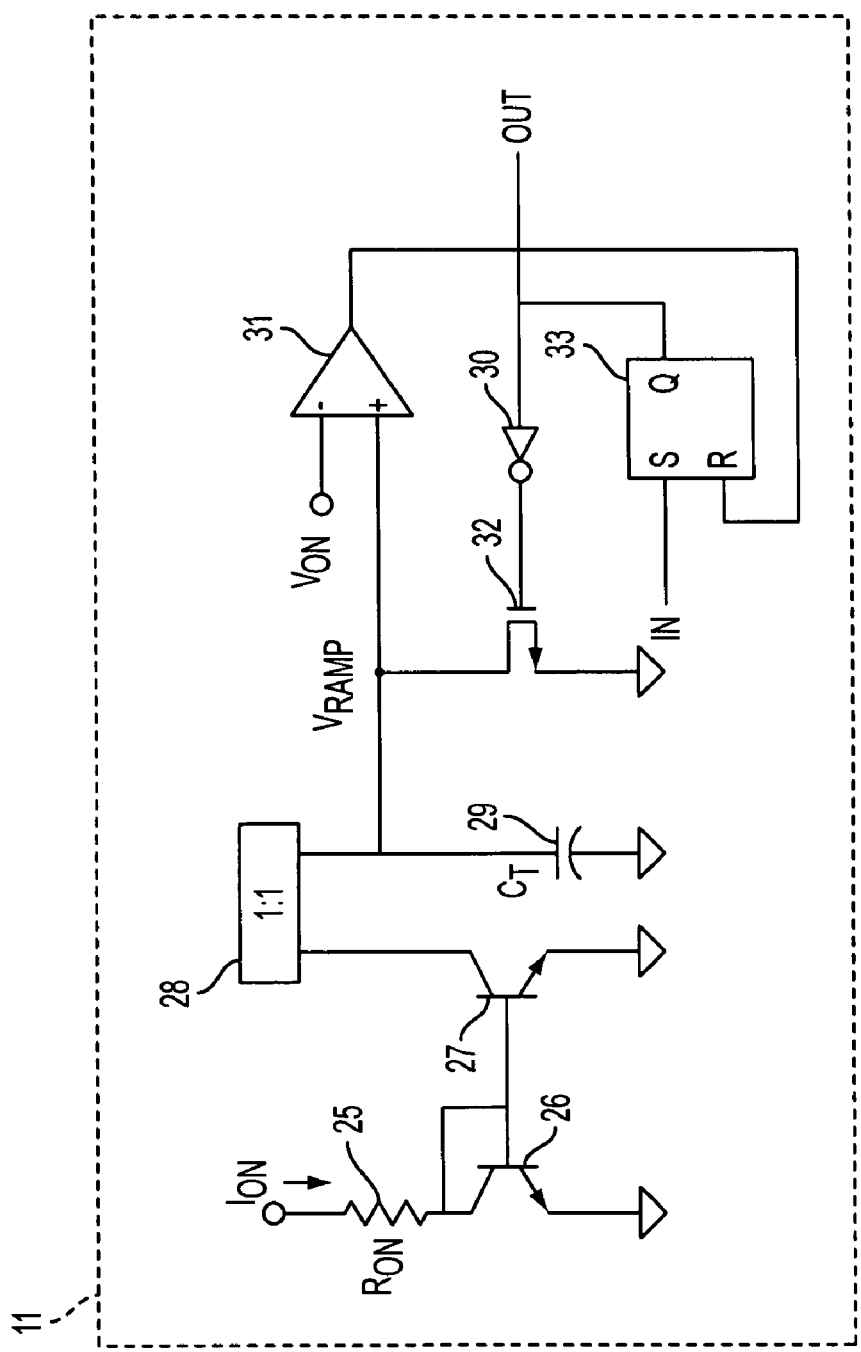
FIG. 2 is a schematic diagram of an illustrative prior art one shot timer to be used in accordance with the synchronous switching voltage regulator of FIG. 1.

Referring now to FIG. 2, a schematic diagram of an illustrative prior art one shot timer to be used in accordance with the synchronous switching voltage regulator of FIG. 1 is described. The input voltage $V_{IN}$ of synchronous switching voltage regulator 10 of FIG. 1 is connected to the $I_{ON}$ input of one shot timer 11, while the output voltage $V_{OUT}$ of regulator 10 of FIG. 1 is connected to the $V_{ON}$ input. In addition to inputs $I_{ON}$ and $V_{ON}$, one-shot timer 11 contains input IN and output OUT.

One shot timer 11 operates as follows. First, the input voltage $V_{IN}$ minus the 0.7V from transistor 26 appears across timing resistor 25 ($R_{ON}$). Then, the current $I_{ON}$ through resistor $R_{ON}$ is transferred to timing capacitor 29 through current mirrors 26–27 and 28. While the input IN to one shot timer 11 is low, the current $I_{ON}$ flows out through reset switch 32, causing the output of comparator 31 to be low.

When the input IN to one shot timer 11 goes high, latch 33 is set and its Q output goes high. This turns off switch 32 and sets output OUT high. Because switch 32 is OFF, timing capacitor 29 is charged up by the mirrored current from the $I_{ON}$ input. When the voltage $V_{RAMP}$ across timing capacitor 29 reaches the output voltage $V_{OUT}$, the output of comparator 31 goes high, thereby resetting latch 33. The result is that one shot timer 11 generates an output pulse that is proportional to $V_{OUT}$ and approximately inversely proportional to $V_{IN}$.

Figure 3A:
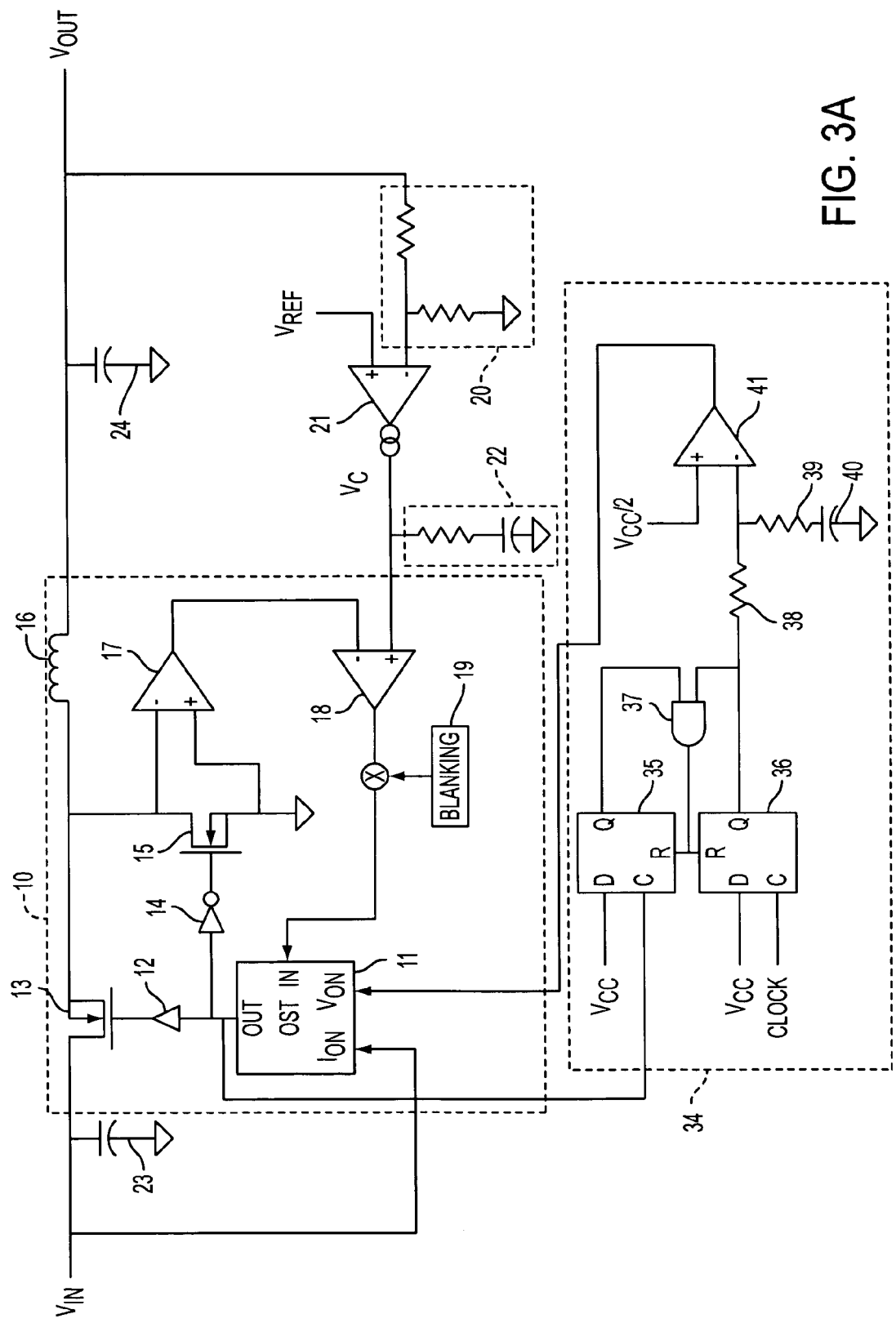
FIG. 3A is a schematic diagram of an exemplary embodiment of the non-constant frequency synchronous switching voltage regulator of FIG. 1 synchronized with a phase locked loop in accordance with the principles of the present invention.

Referring now to FIG. 3A, a schematic diagram of an exemplary embodiment of the non-constant frequency synchronous switching voltage regulator of FIG. 1 synchronized with a phase locked loop in accordance with the principles of the present invention is described. In this circuit, switching voltage regulator 10 of FIG. 1 is synchronized with phase locked loop 34 to control the on-time of one shot timer 11 so that the switching frequency is locked to a reference clock. The result is that a steady state constant switching frequency is achieved.

Phase locked loop 34 includes AND gate 37 and data flip flops 35 and 36. When the flip flop outputs are both zero, a rising edge from CLOCK sets flip flop 36, and a subsequent rising edge from the OUT output of one shot timer 11 sets flip flop 35. When both flip flops are set, AND gate 37 causes both flip flops 35 and 36 to reset. The output of flip flop 36 is a square wave having a rising edge corresponding to the rising edge of the clock and whose falling edge corresponds to the rising edge from the OUT output of one shot timer 11. A loop filter comprising resistors 38 and 39, and capacitor 40 provides an average DC value from the output of flip flop 36.

The on-time of one shot timer 11 is controlled as follows. When the duty cycle of flip flop 36 is less than 50%, the average DC value provided by flip flop 36 is less than $V_{cc}/2$, causing amplifier 41 to increase the $V_{ON}$ input to one shot timer 11. The on-time of switching regulator 10 is increased as described above in connection with FIG. 2. A longer on-time increases the phase delay between CLOCK and the OUT output of one-shot timer 11 as well as the duty cycle of flip flop 36. Analogously, when the duty cycle of flip flop 36 is greater than 50%, the output of amplifier 41 is reduced. Consequently, the on-time of switching regulator 10 decreases. The phase delay between the reference clock and the OUT output of one shot timer 11 also decreases. Phase locked loop 34 therefore continuously adjusts the on-time of one shot timer 11 to maintain the duty cycle of flip flop 36 at 50%. This maintains switching regulator 10 at the same frequency as CLOCK with a 180° phase delay.

Figure 3B:
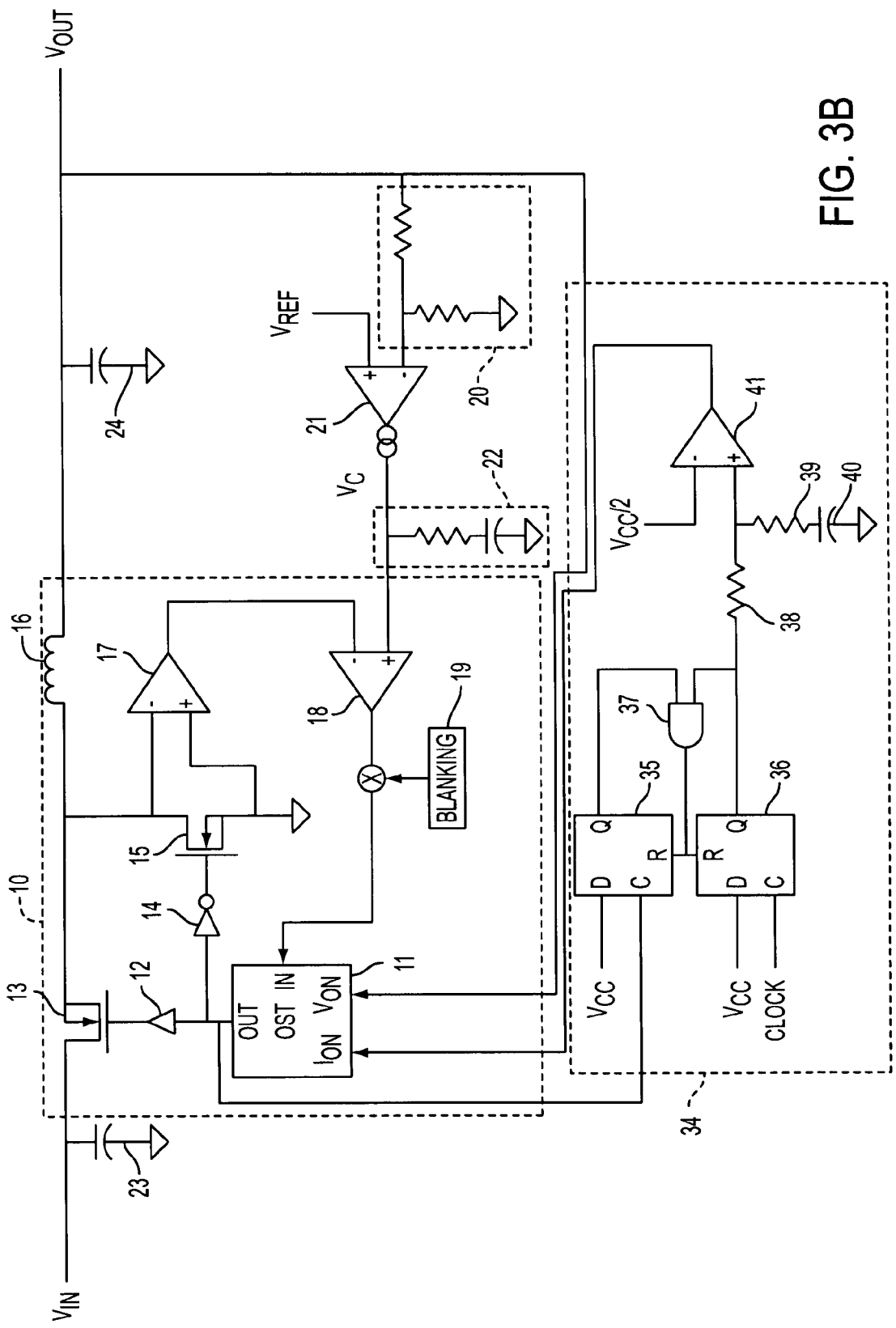
FIG. 3B is a schematic diagram of an alternative embodiment of the non-constant frequency synchronous switching voltage regulator of FIG. 1 synchronized with a phase locked loop in accordance with the principles of the present invention.

Referring now to FIG. 3B, a schematic diagram of an alternative embodiment of the non-constant frequency synchronous switching voltage regulator of FIG. 1 synchronized with a phase locked loop in accordance with the principles of the present invention is described. In the circuit of FIG. 3B, phase locked loop 34 controls the $I_{ON}$ input of one shot timer 11 rather than the $V_{ON}$ input as in the circuit in FIG. 3A. The polarity of the inputs to amplifier 41 have also been reversed. As a result, when the duty cycle of flip flop 36 is less than 50%, the output of amplifier 41 decreases, causing a corresponding decrease in the voltage at the $I_{ON}$ input of one shot timer 11. This increases the on-time of switching regulator 10. The result is that switching regulator 10 is kept at the same frequency as CLOCK with a 180° phase delay.

Although phase locked loop 34 is used to synchronize switching regulator 10 of FIG. 1, it will be understood by one skilled in the art that phase locked loop 34 may be used to synchronize other types of non-constant frequency switching regulator circuits, including synchronous and non-synchronous regulators, such as boost (step-up), buck (step-down), or buck-boost switching regulators, with constant on-time or constant off-time, and using any of several other control techniques. These control techniques include current-mode control with other current sense elements such as a sense resistor or current sense transformer in a variety of locations, voltage-mode control, as well as hybrid control techniques such as sensing based on output capacitor voltage change. Examples of switching regulators using hybrid control techniques include the MAX1710, sold by Maxim Integrated Products, Inc., of Sunnyvale, Calif., and the CS5120, sold by ON Semiconductor, of Phoenix, Ariz.

Figure 4:
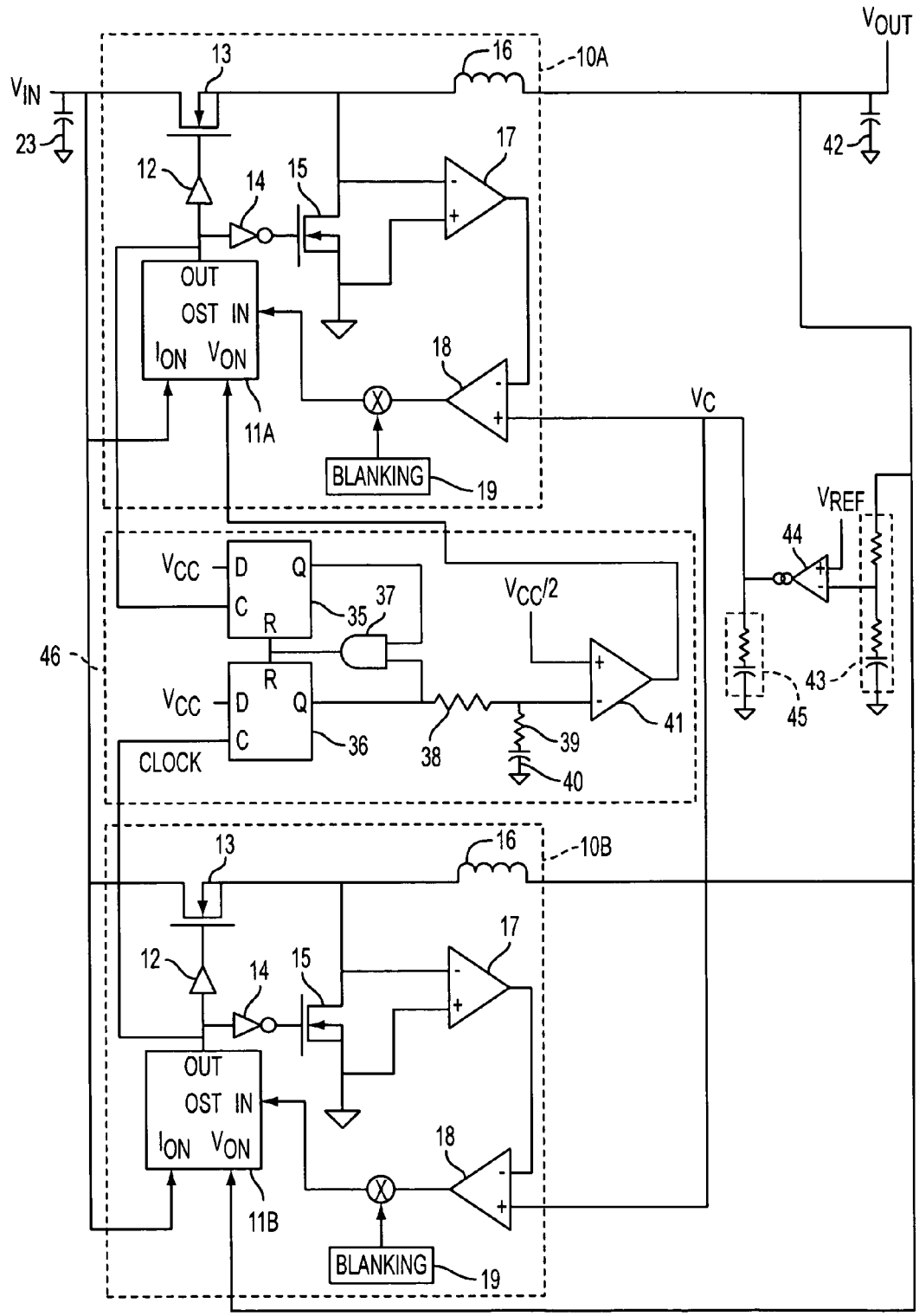
FIG. 4 is a schematic diagram of two non-constant frequency switching voltage regulators of FIG. 1 synchronized with a phase locked loop in accordance with the principles of the present invention.

Referring now to FIG. 4, a schematic diagram of two non-constant frequency switching voltage regulators of FIG. 1 synchronized with a phase locked loop in accordance with the principles of the present invention is described. Switching voltage regulators 10A and 10B operate independently and are connected in parallel, sharing common input capacitor 23, common output capacitor 42, and common current control voltage $V_C$ set by feedback network 43, error amplifier 44, and compensation network 45. The output OUT of one shot timer 11B of switching regulator 10B forms the CLOCK input to phase locked loop 46. Phase locked loop 46 controls the on-time of switching regulator 10A in the same manner as described above in FIG. 3A. Because the clock input of flip flop 36 now comes from switching regulator 10B, switching regulator 10A and switching regulator 10B operate at the same constant switching frequency with a 180° phase delay. In steady-state, the system forms a two-phase switching voltage regulator with reduced input and output ripple currents as well as reduced inductor size and capacitance when compared to a single switching voltage regulator.

Further, it will be understood by one skilled in the art that phase locked loop 46 may be used to synchronize other types of non-constant frequency switching regulator circuits, including synchronous and non-synchronous regulators, such as boost (step-up), buck (step-down), or buck-boost switching regulators, with constant on-time, constant off-time, or hysteretic control, and using any of several other control techniques. These control techniques include current-mode control with other current sense elements such as a sense resistor or current sense transformer in a variety of locations, voltage-mode control, as well as hybrid control techniques such as sensing based on output capacitor voltage change.

In addition, it will be understood by one skilled in the art that phase locked loop 46 may be used to synchronize a plurality of switching regulator circuits to form multiple power converters having two or more phases, multiple inputs and a single output, and multiple outputs with a single input.

Although particular embodiments of the present invention have been described above in detail, it will be understood that this description is merely for purposes of illustration. Specific features of the invention are shown in some drawings and not in others, for purposes of convenience only, and any feature may be combined with other features in accordance with the invention. Steps of the described processes may be reordered or combined, and other steps may be included. Further variations will be apparent to one skilled in the art in light of this disclosure and such variations are intended to fall within the scope of the appended claims.

What is claimed is:

1. A method for synchronizing a non-constant frequency switching regulator that generates a regulated voltage output at an output node, the method comprising:
    controlling the duty cycle of the switching regulator with control circuitry coupled to the output node and adapted to receive one or more variables, the control circuitry generating a pulse that is proportional or inversely proportional or approximately inversely proportional to one of the one or more variables;
    providing as one of the one or more variables a signal corresponding to a voltage at an input node of the switching regulator or a signal corresponding to a voltage at the output node of the switching regulator; and
    providing the control circuitry with an output of a phase locked loop having an input for receiving a clock signal and an output at which a signal is generated to control a parameter of the switching regulator, the phase locked loop adjusting the switching frequency of the switching regulator through control of the parameter.

2. The method of claim 1, wherein the switching regulator comprises a synchronous switching regulator.

3. The method of claim 1, wherein the switching regulator comprises a non-synchronous switching regulator.

4. The method of claim 1, wherein the switching regulator comprises a hysteretic switching regulator and the hysteresis is adjusted by the phase locked loop.

5. The method of claim 1, wherein the on-time of the switching regulator is adjusted by the phase locked loop.

6. The method of claim 1, wherein the off-time of the switching regulator is adjusted by the phase locked loop.

7. The method of claim 1, wherein the switching regulator comprises a switching regulator selected from the group consisting of: a step-down switching regulator; a step-up switching regulator; and a buck-boost switching regulator.

8. The method of claim 1, wherein the switching regulator comprises a one shot timer to control the duty cycle of the switching regulator.

9. The method of claim 1, wherein the phase locked loop comprises:
    a first rising edge triggered data flip flop;
    a second rising edge triggered data flip flop;
    an AND gate coupled between the first and the second flip flops;
    an amplifier coupled between the second flip flop and the one shot timer of the switching regulator; and
    a loop filter to extract the DC average value from the second flip flop.

10. A method for synchronizing a plurality of non-constant frequency switching regulators, the method comprising:
    providing a source voltage at a plurality of input nodes;
    providing a regulated voltage at a plurality of output nodes;
    providing control circuitry coupled to the plurality of output nodes to control the duty cycles of the plurality of regulators; and
    providing a phase locked loop having an input for receiving a clock signal from a first switching regulator selected from the plurality of switching regulators and an output at which a signal is generated to control a parameter of a second switching regulator, the phase locked loop adjusting the switching frequency of the second switching regulator through control of the parameter.

11. The method of claim 10, wherein the plurality of switching regulators comprises synchronous and non-synchronous switching regulators.

12. The method of claim 10, wherein the plurality of switching regulators comprises one or more hysteretic switching regulators and the hysteresis is adjusted by the phase locked loop.

13. The method of claim 10, wherein the plurality of switching regulators comprises one or more switching regulators, wherein their on-time is adjusted by the phase locked loop.

14. The method of claim 10, wherein the plurality of switching regulators comprises one or more switching regulators, wherein their off-time is adjusted by the phase locked loop.

15. The method of claim 10, wherein the plurality of switching regulators comprises one or more step-down switching regulators.

16. The method of claim 10, wherein the plurality of switching regulators comprises one or more step-up switching regulators.

17. The method of claim 10, wherein the plurality of switching regulators comprises one or more buck-boost switching regulators.

18. The method of claim 10, further comprising controlling the duty cycle of each switching regulator from the plurality of switching regulators using one of: current-mode control, voltage-mode control, or a hybrid of current-mode and voltage-mode control.

19. The method of claim 10, wherein each switching regulator from the plurality of switching regulators comprises a one shot timer to control the duty cycle of the switching regulator.

20. (currently amended) The method of claim 10, wherein the phase locked loop comprises:
 a first rising edge triggered data flip flop;
 a second rising edge triggered data flip flop;
 an AND gate coupled between the first and the second flip flops;
 an amplifier coupled between the second flip flop and a one shot timer of the second switching regulator; and
 a loop filter to extract the DC average value from the second flip flop.

21. The method of claim 20, wherein the first flip flop comprises a clock input coupled to an output of a one shot timer of the first switching regulator.

22. The method of claim 20, wherein the second flip flop comprises a clock input coupled to the output of the one shot timer of the first switching regulator.

23. A method for adjusting the switching frequency of a non-constant frequency switching regulator, the method comprising:
 providing a one shot timer in the switching regulator to control the duty cycle of the switching regulator;
 providing a phase locked loop connected to the one shot timer to control a parameter of the one shot timer, causing the switching frequency of the switching regulator to be adjusted through control of the parameter.

24. The method of claim 23, wherein the phase locked loop comprises:
 a first rising edge triggered data flip flop;
 a second rising edge triggered data flip flop;
 an AND gate coupled between the first and the second flip flops;
 an amplifier coupled between the second flip flop and the one shot timer of the switching regulator; and
 a loop filter to extract the DC average value from the second flip flop.

25. The method of claim 24, wherein the first flip flop comprises a clock input coupled to a reference clock.

26. The method of claim 24, wherein the second flip flop comprises a clock input coupled to the output of the one shot timer.

27. The method of claim 23, wherein the switching regulator comprises a synchronous switching regulator.

28. The method of claim 23, wherein the switching regulator comprises a non-synchronous switching regulator.

29. The method of claim 23, wherein the on-time of the switching regulator is adjusted by the phase locked loop.

30. The method of claim 23, wherein the off-time of the switching regulator is adjusted by the phase locked loop.

31. The method of claim 23, wherein the switching regulator comprises a switching regulator selected from the group consisting of: a step-down switching regulator; a step-up switching regulator; and a buck-boost switching regulator.

32. The method of claim 23, further comprising controlling the duty cycle of the switching regulator using one of: current-mode control, voltage-mode control, or a hybrid of current-mode and voltage-mode control.

33. A circuit for adjusting the switching frequency of a non-constant frequency switching regulator having a one shot timer to control the duty cycle of the switching regulator, the one shot timer coupled between an input voltage and a regulated output voltage, the circuit comprising:
 a phase locked loop connected to the one shot timer to control a parameter of the one shot timer, causing the switching frequency of the switching regulator to be adjusted through control of the parameter.

34. The circuit of claim 33, wherein the phase locked loop comprises:
 a first rising edge triggered data flip flop;
 a second rising edge triggered data flip flop;
 an AND gate coupled between the first and the second flip flops;
 an amplifier coupled between the second flip flop and the one shot timer; and
 a loop filter to extract the DC average value from the second flip flop.

35. The circuit of claim 34, wherein the first flip flop comprises a clock input coupled to a reference clock.

36. The circuit of claim 34, wherein the second flip flop comprises a clock input coupled to the output of the one shot timer.

37. The circuit of claim 33, wherein the switching regulator comprises a synchronous switching regulator.

38. The circuit of claim 33, wherein the switching regulator comprises a non-synchronous switching regulator.

39. The circuit of claim 33, wherein the on-time of the switching regulator is adjusted by the phase locked loop.

40. The circuit of claim 33, wherein the off-time of the switching regulator is adjusted by the phase locked loop.

41. The circuit of claim 33, wherein the switching regulator comprises a switching regulator selected from the group consisting of: a step-down switching regulator; a step-up switching regulator; and a buck-boost switching regulator.

42. The circuit of claim 33, further comprising controlling the duty cycle of the switching regulator using one of: current-mode control, voltage-mode control, or a hybrid of current-mode and voltage-mode control.

43. A circuit for synchronizing a plurality of non-constant frequency switching regulators, each switching regulator from the plurality of switching regulators having a one shot timer to control the duty cycle of the switching regulator, the one shot timer coupled between an input voltage and a regulated output voltage, the circuit comprising:
 a phase locked loop coupled between the one shot timer of a first switching regulator and the one shot timer of a second switching regulator selected from the plurality of switching regulators, the phase locked loop receiving a clock signal from the one shot timer of the first switching regulator and generating an output signal to control a parameter of the second switching regulator, the phase locked loop adjusting the switching frequency of the second switching regulator through control of the parameter.

44. The circuit of claim 43, wherein the plurality of switching regulators comprises synchronous and non-synchronous switching regulators.

45. The circuit of claim 43, wherein the plurality of switching regulators comprises one or more switching regulators, wherein their on-time is adjusted by the phase locked loop.

46. The circuit of claim 43, wherein the plurality of switching regulators comprises one or more switching regulators, wherein their off-time is adjusted by the phase locked loop.

47. The circuit of claim 43, wherein the plurality of switching regulators comprises one or more step-down switching regulators.

48. The circuit of claim 43, wherein the plurality of switching regulators comprises one or more step-up switching regulators.

49. The method of claim 43, wherein the plurality of switching regulators comprises one or more buck-boost switching regulators.

50. The circuit of claim 43, further comprising controlling the duty cycle of each switching regulator from the plurality of switching regulators using one of: current-mode control, voltage-mode control, or a hybrid of current-mode and voltage-mode control.

51. The circuit of claim 43, wherein each phase locked loop from the plurality of phase locked loops comprises:
a first rising edge triggered data flip flop;
a second rising edge triggered data flip flop;
an AND gate coupled between the first and the second flip flops;
an amplifier coupled between the second flip flop and the one shot timer of the second switching regulator; and
a loop filter to extract the DC average value from the second flip flop.

52. The circuit of claim 51, wherein the first flip flop comprises a clock input coupled to the output of the one shot timer of the second switching regulator.

53. The circuit of claim 51, wherein the second flip flop comprises a clock input coupled to the output of the one shot timer of the first switching regulator.

* * * * *